US008858341B2

(12) United States Patent
Weiland

(10) Patent No.: US 8,858,341 B2
(45) Date of Patent: Oct. 14, 2014

(54) MULTI VIDEO GAME CHANGER

(76) Inventor: Jeff Weiland, Irvine, CA (US)

(*) Notice: Subject to any disclaimer, the term of this patent is extended or adjusted under 35 U.S.C. 154(b) by 988 days.

(21) Appl. No.: 12/543,296

(22) Filed: Aug. 18, 2009

(65) Prior Publication Data
US 2010/0048306 A1 Feb. 25, 2010

Related U.S. Application Data

(60) Provisional application No. 61/090,861, filed on Aug. 21, 2008.

(51) Int. Cl.
A63F 9/24 (2006.01)
A63F 13/00 (2014.01)
A63F 13/90 (2014.01)

(52) U.S. Cl.
CPC ........... *A63F 13/00* (2013.01); *A63F 2300/207* (2013.01); *A63F 2300/401* (2013.01); *A63F 13/08* (2013.01); *A63F 2300/404* (2013.01)
USPC .............................................. 463/43; 463/45

(58) Field of Classification Search
USPC ................... 463/43, 46, 40, 44, 45
See application file for complete search history.

(56) References Cited

U.S. PATENT DOCUMENTS

| 5,437,464 | A | * | 8/1995 | Terasima et al. | 463/43 |
| 5,550,999 | A | * | 8/1996 | Nagano et al. | 711/115 |
| 6,131,129 | A | * | 10/2000 | Ludtke et al. | 710/5 |
| 2002/0006828 | A1 | | 1/2002 | Gerding | |
| 2003/0017872 | A1 | * | 1/2003 | Oishi et al. | 463/33 |
| 2004/0009815 | A1 | * | 1/2004 | Zotto et al. | 463/42 |
| 2004/0110566 | A1 | | 6/2004 | Schneider | |
| 2004/0225894 | A1 | | 11/2004 | Colvin | |
| 2006/0148568 | A1 | * | 7/2006 | Schultz et al. | 463/42 |
| 2006/0239658 | A1 | | 10/2006 | St. Hilaire | |
| 2007/0207843 | A1 | * | 9/2007 | Hwang | 463/1 |
| 2007/0207862 | A1 | * | 9/2007 | Calhoun | 463/46 |
| 2007/0263493 | A1 | | 11/2007 | Rodgers | |
| 2008/0032803 | A1 | | 2/2008 | Hansen | |
| 2008/0119286 | A1 | * | 5/2008 | Brunstetter et al. | 463/43 |

FOREIGN PATENT DOCUMENTS

GB 2254469 10/1992

* cited by examiner

*Primary Examiner* — David L Lewis
*Assistant Examiner* — Robert Mosser
(74) *Attorney, Agent, or Firm* — Fish & Tsang LLP

(57) ABSTRACT

A multi video game changer is presented. A video game changer can comprise a magazine for holding multiple video game media. The changer receives instructions, possibly including software instructions, from a game console on how to access video game data on the game media. In response, the changer streams the game data to the game console while buffering small portions of the game data.

21 Claims, 3 Drawing Sheets

MULTI VIDEO GAME CHANGER

This application claims the benefit of priority to U.S. provisional application having Ser. No. 61/090,861 filed Aug. 21, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is game console support.

BACKGROUND

Video game consumers often find themselves switching from one game to another during a gaming session. Unfortunately, gaming consoles support only a single disc or cartridge, which can result in significant down time while switching among a set of favorite games. Typically switching games includes many if not all of the following steps. The consumer first should turn off the power to the gaming system. The consumer removes the game media (e.g., a platter, an optical disc, cartridge, etc.) and places the media in its holder. The consumer then selects a new game and places its media into the game system. Finally, the consumer reboots the game system.

Ideally a game consumer should be able to switch among favorite games without having to search for lost holders, to search for lost games, or to reboot the game console. One approach to reduce the need for switching games in and out of a game console is to provide a disc changer. For example, U.S. patent application publication 2007/0263493 to Rodgers titled "Video Game Disc Changer" (November 2007), describes a changer that can be controlled via a remote. However, it is unlikely that producers of game consoles would modify their current consoles to integrate such a multi-disc tray due to increased costs.

Another approach for a game disc changer taken by others includes offering an external changer that connects to a game console. U.S. patent application publication 2008/00328302 to Hansen titled "Video Game Disc Changer" (February 2008) discloses multi-disc cartridge that can be inserted into a changer. The changer connects to a game console via a USB connection.

Further examples of effort put forth to support multiple game media for a game console include the following:
- U.K. patent application publication GB 2 254 469 to Marchini titled "Data Storage" (October 1992) describes a common data store across multiple entertainment devices including game systems where a mechanical disc changer can select one of multiple discs for use by a remote entertainment device.
- U.S. patent application publication 2002/0006828 to Gerding titled "Arcade Style Video Game Adapter System" (January 2002) discloses a game adapter system supporting different types of game systems or audio-visual components. Games can be accessed from a disc changer having a USB data port.
- U.S. patent application publication 2004/0110566 to Schneider titled "Video Game Jukebox" (June 2004) discusses disk storage device for storing multiple video-disks.
- Although very short U.S. patent applicator publication 2006/0239658 to St. Hilaire titled "Multiple Disc Changer Video Game" (October 2006) contemplates a rotatable disc changer.
- U.S. patent application publication 2007/0207843 to Hwang titled "Multi-Disc Changer for Computer Gaming Device" (September 2007) describes a disc changer supporting various types of discs including game discs, DVDs, or CDs. The changer reads metadata from a disc and presents the metadata on a screen.

Although the above references offer potential avenues for reducing down-time of switching games, the references and others in the market have failed to result in products having market traction. One reason for such failures is video game changers lack support for addressing concerns of game console producers with respect to protecting their proprietary intellectual property. Game consoles include proprietary protocols or technology for reading and engaging with game data via a game data reader to ensure only those having a proper license can provide third party products for the game console. Existing or known changers lack support for engaging properly with a game console to ensure the console producers retains control over their technology without exposing their proprietary technology to others.

Some effort has been put forth to protect game intellectual property. For example, U.S. patent application publication 2004/0009815 to Zotto et al. titled "Managing Access to Content" (January 2004) and U.S. patent application 2004/0225894 to Colvin titled "Hardware Based Method for Digital Rights Management Including Self Activating/Self Authenticating Software" (November 2004) both discuss an environment where keys are used to obtain and decrypt content. Such approaches are useful for Digital Right Management (DRM) of a game, but fail to address issues related to using a remote reader according to a console's proprietary protocols.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The market has yet to appreciate, until now, that a viable video game changer can be responsive to instructions from a game console to ensure the console can properly enforce its protocols while the game changer accesses a game media. In such an approach a game console controls the game changer using the console's proprietary technology without disclosing to a third party how game data should be read. Additionally a video game changer can operate with significantly reduced memory by streaming game data from the game changer to the game console. Utilizing a reduced memory for buffering or caching video game data aids in protecting the digital rights of the game publisher by ensuring that only a minute portion of the video game can be stored outside the game console. At no time does a complete copy of the game exist in a third-party's data store (e.g., hard disc, RAM, flash memory, etc . . . ) where an unauthorized entity could obtain a copy of the game.

Thus, there is still a need for video game changer that respects the intellectual property of others in the gaming industry.

SUMMARY OF THE INVENTION

The present inventive subject matter is drawn to systems, configurations, and methods of providing a video game changer. A preferred video game changer comprises a magazine for holding a plurality of video game media (e.g., CDs, DVDs, Blu-Ray discs, cartridges, solid-state memory devices, etc.). The magazine operates in conjunction with a media interface adapted to access the game data from the video game media. The changer also includes a module comprising a combination of hardware, software, or firmware that communicates with a remote game console. The module includes a memory storing software instructions that accepts a connection from the game console over a communication interface and accepts additional instructions from the game console regarding how to read game data from the media. The module streams the video game data to the game console over the communication interface. In a preferred embodiment, an amount of data buffered is restricted from exceeding no more than ten percent of a capacity of a game media.

In one aspect of the inventive subject matter, a video game changer comprises a common housing containing one or more of each of the following: a magazine for holding multiple video games, a communication interface, a media interface for accessing the video game media, and module for communicating with a game console. In a preferred embodiment, the magazine is removable where a consumer can remove the magazine and insert a new magazine with a different set of games. It is also contemplated that the media interface can be removed in support of upgrading the changer from one type of media to another. For example, a consumer could replace an old DVD media interface with a new Blu-ray media interface. In some embodiments the common housing also includes removable faceplates allowing a consumer to customize the exterior of their changer.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion relates to a video game changer for a game console. One should appreciate that a game console is not a personal computer, but rather a computing device having a dedicated purpose of reading game data from a game media (e.g., disc, cartridge, ROM, etc.), interpreting the game data, and presenting the game to a player.

Figure 1:
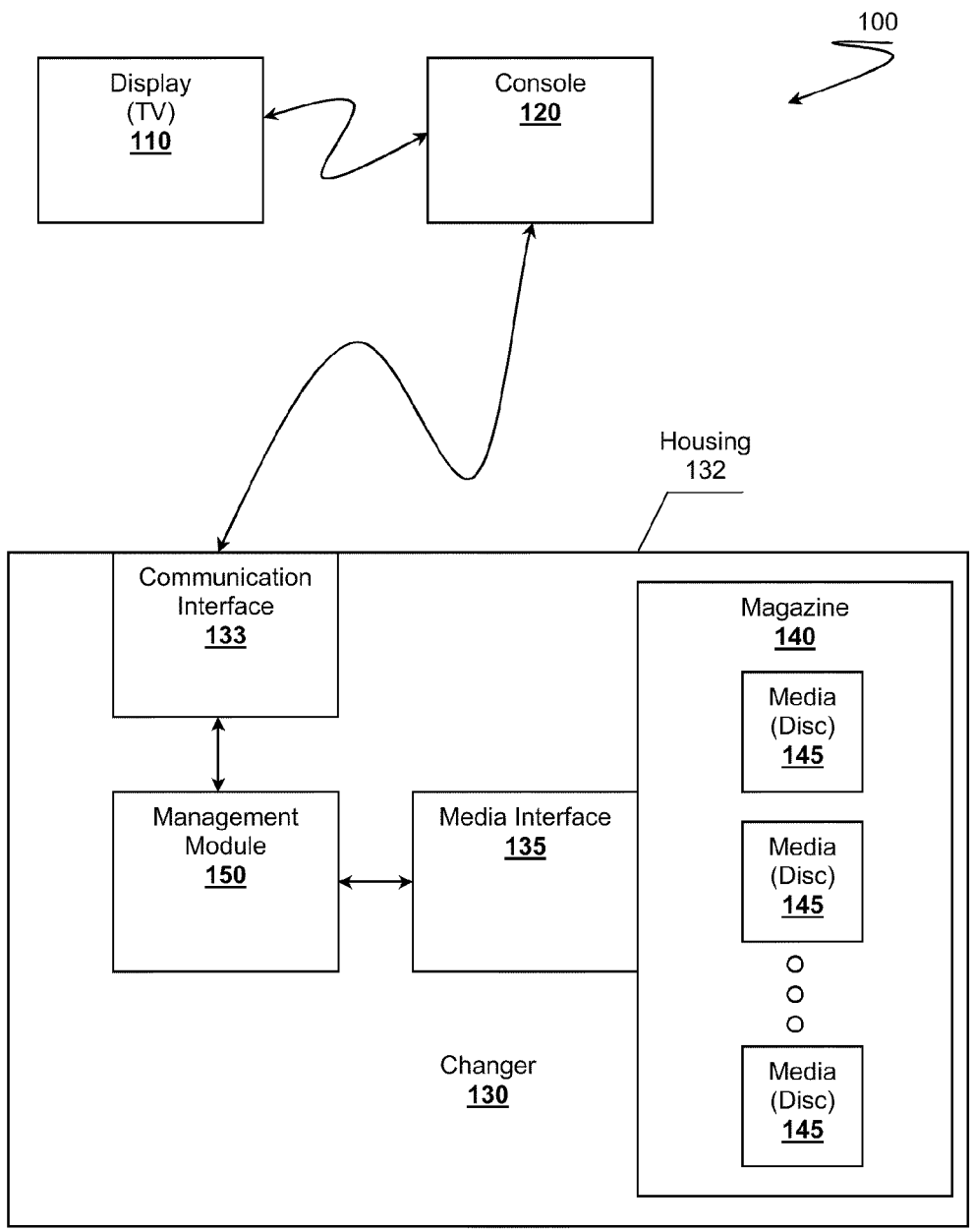
FIG. 1 is a possible block diagram of a multi video game changer.

In FIG. 1, game system 100 can comprise game console 120, possibly connected to display 110, and game changer 130. Game console 120 represents a video gaming platform configured to accept one of game media 145, interpret the game data on game media 145, and provide a gaming experience to a game player based on the game data. Game console 120 can comprise hand-held game device or a non-hand-held device. Example, non-hand-held gaming devices include the Sony PlayStation™, Sony PlayStation 2™ (PS2), Sony PlayStation 3™ (PS3), Nintendo Wii™, Microsoft XBOX™, Microsoft XBOX 360™, or other gaming platforms known or yet to be developed. Example hand-held gaming devices that could operate as console 120 include the Sony PlayStation Portable™ (PSP), Nintendo Gameboy™, Nintendo DS™, Tiger Gizmondo™, or other hand-held gaming platforms. The names of actual companies and products mentioned herein may be the trademarks of their respective owners. In a preferred embodiment, console 120 comprises non-hand-held console.

In some embodiments, game console 120 connects to display 110, which presents gaming content to a game player. Display 110 can include any suitable display device including a television, a monitor, an LCD display, a plasma display, or other device capable of rendering an image under the control of console 120. Display 110 can also include audio output, possibly speakers (not shown) for playing audio data under control of console 120. Separate audio outputs are also contemplated.

Console 120 can connect to display 110 via a wired or wireless connection using known techniques. For example, a wired connection could employ using an HDMI cable, an S-Video cable, audio cables, or other cables. It is also contemplated a wired connection can comprise Ethernet cables, possibly as part of a packet switched network operating as a media network among various media components. A wireless connection could comprises 802.11, wireless USB, wireless 5.8 GHz A/V transmitter-receiver, or other wireless technology capable of exchanging A/V data among media components.

Although display 110 is shown external to console 120, it is contemplated that display 110, or audio output, can be internal to console 120. In embodiments where console 120 comprises a hand-held gaming device (e.g., PSP, Nintendo DS, etc.), the hand-held device can include display 110, for example.

Changer 130 preferably comprises console communication interface 133, media management module 150, and media interface 135. Changer 130 can also include media magazine 140 configured to hold a plurality of video game media 145. In a preferred embodiment, changer 130 comprises an external device relative to console 120 where the components of changer 130 are commonly disposed within housing 132. However, it is also contemplated that changer 130 could be integrated within console 120, possibly as a removable component.

Housing 132 can be an enclosure in which the various components of changer 130 are disposed. In some embodiments, housing 132 can be configured to allow removal or replacement of the various components including communication interface 133, media interface 135, magazine 140, or module 150. It is also contemplated that housing 132 could comprise one or more removable faceplates or bezels to allow consumers to customize changer 130.

Communication interface 133 preferably comprises a wired or wireless interface compatible with a corresponding interface on console 120. Communication interface 133 provides for a communication connection between changer 130, preferably via management module 150, and console 120 to exchange game data from media 145 or to exchange information regarding how to gain access to the game data. Example wired interfaces can comprise support for Ethernet, USB, Firewire, optic-fiber, or other wired-based communication interface. Example wireless interfaces can comprise support for Bluetooth, wireless USB, 802.11, UWB, Wi-Max, or other wireless communication interface. Especially preferred interfaces include USB or Ethernet. However, Bluetooth could also be employed. It is contemplated that changer 130 could include more that one of communication interface 133 including a heterogeneous mix of interface types to provide for compatibility across multiple gaming platforms.

Changer 130 also preferably includes one or more of media interface 135, which is configured to engage with magazine 140 to at least read game data from game media 145 under instruction from management module 150. Media interface 135 can employ various suitable approaches for reading media 145. In some embodiments, media interface 135 includes read-heads adapted to read rotating media 145. Read-heads can include optical read heads for reading optical media (e.g., CD, DVD, Blu-Ray, HD-DVD, Holographic Versatile Disc, etc.), or magnetic read-heads (e.g., HDD, tape, etc.). It is also contemplated that media interface 135 can include a bus interface that can connect to a solid state media (e.g., SSD, SD card, memory stick, flash, etc.). In some embodiments, possibly when changer 130 supports different types of gaming consoles 120, changer 130 can include a heterogeneous mix of media interfaces 135. Acceptable interfaces include those commonly employed in existing media players or gaming consoles 120.

Media interface 135 can also be removable or replaceable from housing 132. It is also contemplated that media interface 135 could be integrated into magazine 140 to allow changer 130 to operate with a wider range of game console platforms.

Magazine 140 can also take on many different forms depending on the target media 145. In some embodiments magazine 140 comprises a rotating platter having receptacles for a plurality of media discs. In other, more preferred embodiments, magazine 140 comprises a cartridge having multiple media slots and that is capable of storing multiple game media 145. In a preferred embodiment, magazine 140 comprises a cartridge capable of holding at least six, ten, twelve, or more discs. Media 145 can be loaded directly into magazine 140, which is then inserted into changer 130. In other more preferred embodiments, media 145 can be individually loaded into a loading slot in the housing of changer 130, which then places media 145 into magazine 140. It is specifically contemplated that magazine 140 could support holding a heterogeneous mix of media 145 including combinations of CDs, DVDs, Blu-Ray, solid state disks (e.g., SSD), flash cards, or other types of media.

One should appreciate that magazine 140 could be removable. Such an approach allows a gamer to create a library of magazines 140. When desired, a complete magazine can be inserted into changer 130. This approach also provides benefits to game developers. As games grow ever larger, possibly at a faster pace than the capacity of media 145, game developers can package a game with multiple media 145 together, possibly packaged in magazine 140, as a single game. The advantage is that a game would not be required to swap game media as they complete a game that bridges across multiple media.

A preferred magazine 140 comprises an internal magazine. Changer 130 can include a slot through which discs can be interested. Charger 130 can include a loading mechanism as is known in the art to load the discs into internal magazine 140.

Preferred changers 130 include media management module 150. Module 150 can be configured to take on roles, responsibilities, or functions to access game data on media 145 according to requirements, protocols, policies, or other criteria dictated by console 120. Module 150 is discussed more fully below with respect to FIG. 2.

Changer 130 can also include additional features. One contemplated feature includes a network interface, through which changer 130 can exchange data with other devices on a local area network, the Internet, or other networks. In some embodiments, changer 130 can communicate with Internet-based severs to obtain firmware updates, programming information, authorizations, or other data. Another possible feature includes one or more additional A/V interfaces to allow changer 130 to operate as a media player. Changer 130 can be connected directly with A/V equipment (e.g., display 110) and can play audio or video data on media 145 directly on the A/V equipment.

Figure 2:
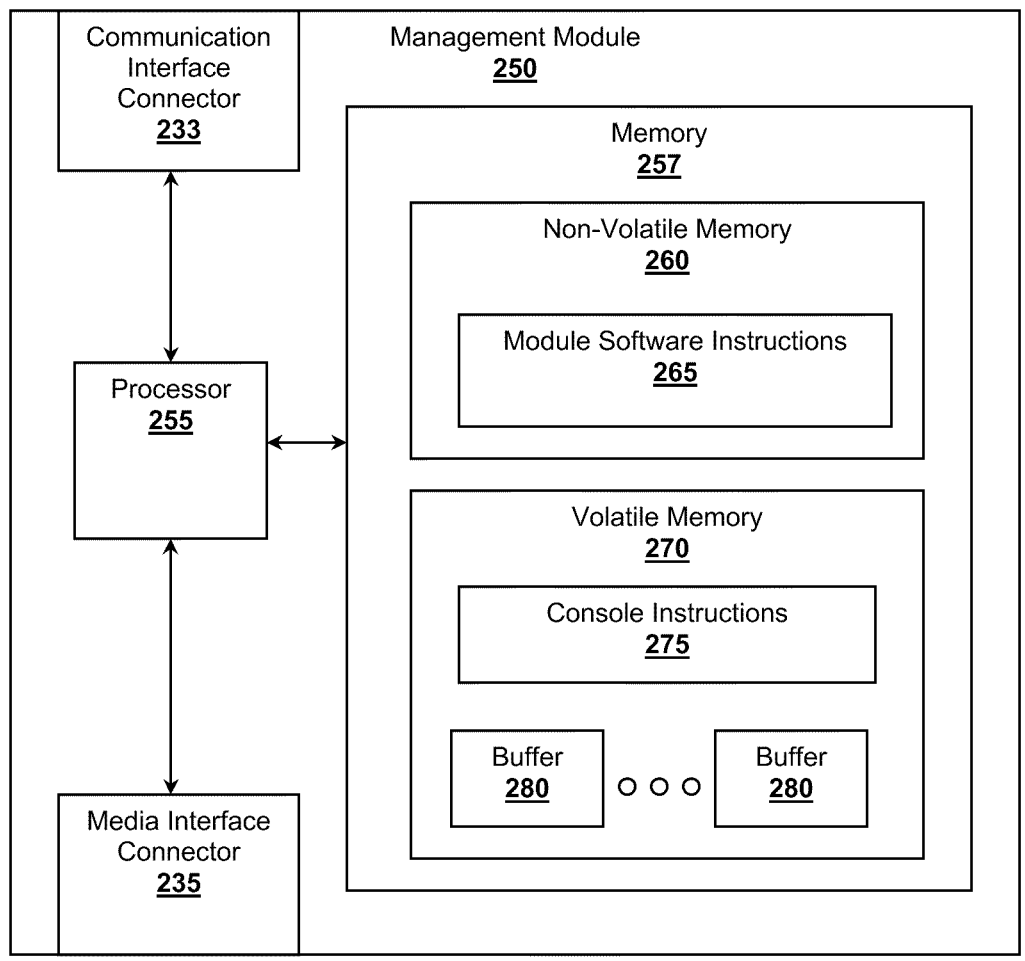
FIG. 2 is a possible block diagram of a media management module.

In FIG. 2, a possible embodiment of management module 250 is presented. Media management module 250 preferably includes processor 255 communicatively coupled to memory 257. Processor 255 is configured to execute software instructions 265 stored in computer readable memory 257. Software instructions 265 represent instructions that allow module 250 to fulfill its roles, responsibilities, or functions described below. In more preferred embodiments, module 250 also comprises communication interface connector 233 and media interface connector 235. Both connectors 233 and 235 provide connectivity to the changer's respective interfaces.

Although module 250 is presented as a single component, it should be appreciated that module 250 could comprise physically discreet parts aggregated together physically on the same PCB, different PCBs, or in other configurations. In a preferred embodiment, module 250 comprises a single PCB, on which the various discreet parts are integrated. In some embodiments, module 250 exists on single PCB that serves as a main motherboard for a game changer. In other embodiments, module 250 can be a separate daughter or mezzanine board that interfaces to a main motherboard of the game changer. Such an approach provides for physically removing module 250 from a changer to replace, upgrade, repair, or otherwise change module 250.

Module 250 can include communication connector 233 that provides a communication connection to a changer's console interface. Connector 233 ensures that module 250 can exchange various data with a console. In some embodiments, connector 233 is the changer's communication interface. In other embodiments, connector 233 could a bus connector, plug, socket, or other means for connecting to a bus external to module 250.

In a similar vein media interface connector 235 can also be the changer's media interface. Connector 235 could also be a bus connector, plug, socket or other similar connector means to provide a communication path to external components.

Processor 255 can include any suitable processor capable of supporting the describe functionality, including those produced by Intel™, AMD™, FreeScale™, Motorola™, IBM™, or other processor manufactures. A preferred processor 255 provides support for communication interface connector 233 or media interface connector 235. Processor 255 can access memory 257 using known bus architectures.

Memory 257 can be a combination of conventional non-volatile memory (NVM) 260 or volatile memory 270. Examples of non-volatile memory 260 include flash, ROM, MRAM, or other types of computer readable media capable of persistently storing data across power cycles. It is also contemplated that non-volatile memory 260 could include a drive (e.g., HDD, SSD, CD, DVD, etc.) etc. Volatile memory 270 preferably includes RAM that can have its stored data removed easily, especially across the changer's power cycles. It is also contemplated that at least a portion of memory 257 could be configured to comply with one or more security standards including FIPS-140 to protect stored information.

In a preferred embodiment NVM 260 stores module software instructions 265 that guide the roles, responsibilities, or functionality of module 250. In some embodiments, NVM 260 stores one or more identifiers, possibly secret keys, which can be used to establish secured communication channels with devices external to module 250.

Volatile memory 270 preferably transiently stores console instructions 275 and one or more of buffer 280 as further discussed below.

Module software instructions 265 preferably provide three main features.

First, instructions 265 allow module to accept, receive, or otherwise establish a communication connection between module 250 and a remote console. The connection can be established as an application layer protocol possibly implemented on a networking layer API of a communication stack. For example, in an embodiment employing a TCP/IP stack for communication with a console, instructions 265 can create a TCP/IP socket that listens for connections from the console. One should appreciate that other types of connections can also be supported. It is also contemplated that the connection can be secured via one or more secret keys, possibly by establishing a secured connection using one or more protocols (e.g., SSL, SSH, HTTPS, etc.) or algorithms (e.g., AES, DES, 3DES, etc.).

Establishing a communication connection with the console can include exchanging keys, authenticating the changer with respect to the console, securing the connection is intimated above, or authorizing the changer to access information on the console. For example, the changer can utilize a stored identifier to perform one or more of the previous actions, where the identifier indicates the changer is produced under license of the console producer. The console can cooperate with module 250 to authenticate the changer as a viable source of game data based on the changer's identifier.

Second, instructions 265 allow module 250 to exchange data with the remote console over the established connection. Preferably the exchanged data includes console instructions 275 that comprise information relating how to access game data on the game media via a media interface. One should note that console instructions 275 can represent the proprietary technology or protocols of the console producer and are to be protected, where console instructions 275 define how to read game data from the game media using the media interface of the changer. Thus, in preferred embodiment, console instructions are transiently stored in volatile memory 270, possibly in a secured portion of memory 270. Console instructions 275 can easily be wiped from memory 270 as necessary to ensure that the proprietary instructions are not compromised.

In some embodiments, a console is a prior configured with console instructions 275. When the console detects the presence of the changer, the console can initiate a connection to the changer. Once module 250 receives the connection, the console can upload console instructions 275 to memory 270. Module 250 can accept the additional instructions from the game console through the connection. Uploading console instructions 275 can include providing media interface drivers, instantiating a secured virtual machine under (SVM) control of the console where the SVM controls the media interface, sending compiled module code, or other forms of presenting instructions to module 250.

Naturally, the order of which device initiates the connection can be changed to suit a particular application. In more preferred approaches, the changer can be packaged with a media (e.g., software disc, CD, DVD, etc.), that store drivers, software, or console instructions 275. The media can be inserted into the console after purchase, and data on the media can be used to configure the console to operate with the changer by interfacing with module 250. One should note that console instructions 275 can, at all times, remain under control of the console as opposed to being a prior available to the changer. Such an approach reduces barriers of acceptance for a game changer by console producers because the console producer retains control of how their proprietary technology is used.

Third, module software instructions 265 allow module 250 to stream game data to the game console over the connection. In a preferred embodiment, software instruction 265 provide for establishing one or more of buffers 280. Furthermore, the amount of game data that is buffered in a buffer 280 is restricted to ensure that the game data itself remains protected. In a preferred embodiment, module instructions 265 or console instructions 275 restricts the amount of data buffered from exceeding no more than ten percent of a capacity of the game media. For a DVD storing about 4.7 GB, the amount buffer would be less than 470 MB. This ensures that buffer 280, or memory 270, will store much less data than the entire game. In more preferred embodiments, the amount of data buffered in buffer 280 is restricted from exceeding no more than five percent (e.g., about 235 MB for a DVD), a more preferably no more than one percent (e.g., about 47 MB for a DVD), and yet more preferably no more than 0.02 percent (e.g., about 1 MB for a DVD). Buffers 280 are preferably restricted by instantiating buffer 280 with a reduced amount of memory. In more preferred embodiments, buffer 280 can be secured so that only the console is authorized to request data form the buffer.

One should appreciate that the smaller the buffer size relative to the size of the game is considered to be more advantageous to reduce a risk of exposing proprietary data and to provide increased DRM capabilities. This approach is counter to traditional approaches where lager buffers are considered more advantageous.

In some embodiments, module 250 supports multiple buffers 280. Such an approach allows for instantiating a buffer 280 for each of the games currently in the changer. Having a buffer 280 for each game provides for a gamer to seamlessly switch between one game media and another by having reduced load times. For example, upon loading a changer with a magazine, module 250 could pre-load buffers 280 with game data from each game media. When a game switches games via the console, the changer begins auto streaming the game data from the corresponding buffer without having to wait until media interface engages with the game media.

Buffers 280 can be instantiate remotely by the console. One aspect of the inventive subject matter is considered to include the concept of a console remotely making a memory allocation request from module 250 (e.g., a remote $_{malloc(\ )}$ call). Module instructions 265 can be configured to accept such a request, assuming any required authentication or authorization actions have been taken.

Module instructions 265, console instructions 275, or other configuration information can be used to provide additional features to aid in protecting third-party intellectual property rights. One feature includes automatically erasing one or more of buffer 280, or possibly console instructions 275 upon detection of an event. For example, removing a game media or the changer's magazine can trigger erasure of portions of memory 270. Other triggering events could include detection of a loss of connection with the console, detection of loss of power to the console, or detection of tampering with the changer's housing or other components. Erasing portions of memory 270 can include powering the memory down, or writing non-game data to all memory locations, possibly writing NULL values to the memory locations.

Yet another feature can include reading portions of the game data on a plurality of the media stored in the changer's magazine. In a preferred embodiment portions include descriptive information about the games that can be displayed. Along similar lines, module instructions 265 can be configured to provide information associated with the changer, which can be displayed via the console as an on-screen menu. Players or other users can interact with the changer to via the menu. A selected menu option can be passed to module 250 via the console, where module 250 properly handles the requested option.

It is also contemplated that memory 257 as a whole can have a smaller capacity relative the game media. In a preferred embodiment, memory 257 preferably has a capacity of no more than one GB, preferably where no more than half is dedicated to volatile memory 270.

Figure 3:
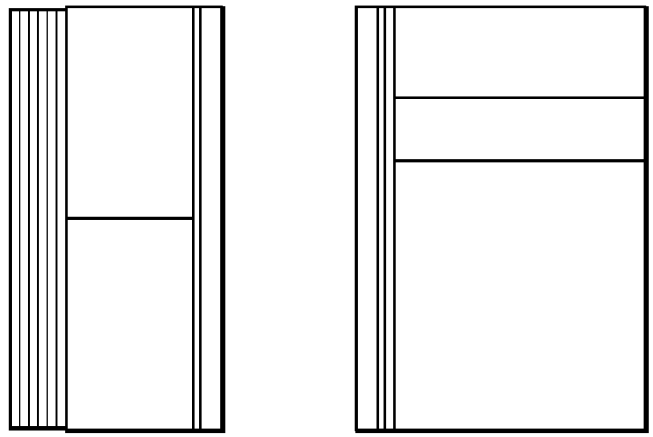
FIG. 3 is a product brochure of a possible embodiment a multi video game changer.

FIG. 3 illustrates a product brochure for game changer that can be suitably adapted to employ one or more of the disclosed techniques. The product illustrated is Extreme Gamer™ multi video game changer for the PlayStation® 2 platform and is produced by Digital Extreme Technologies™ of Irvine, Calif. (http://www.dxtinc.com).

One should appreciate that the disclosed subject matter is considered to include many different inventive concepts. One concept includes providing a changer lacking instructions on how to access a media interface or game media. Such instructions are provided by and remain under direction of a game console. Another concept includes configuring a game changer to operate with different types of consoles. For example, a changer can be configured to operate with a PS2 as well as a PS3, or possibly a Wii. Still another concept includes methods of changing games that includes a changer downloading instructions from a console to properly interface with a media interface to access game data on a game media, and possibly including restricting an amount of game data that can be buffered.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A multi video game changer, comprising:
   a magazine configured to hold a plurality of video game media;
   a communication interface compatible with a game console;
   a media interface adapted to access game data on the plurality of video game media from the magazine;
   a management module having a memory and a processor configured to execute software instructions stored in the memory, the software instructions configured to:
   (a) receive a connection over the communication interface from the game console,
   (b) accept proprietary instructions from the game console through the connection defining how to locally read game data from one or more of the plurality of video game media using the media interface;
   (c) instantiate, according to the proprietary instructions, a secured buffer within the memory where only the game console is authorized to access the secured buffer, the secured buffer restricted to have a capacity less than an entire game stored on at least one of the plurality of video game media; and
   (d) read the game data from one or more of the plurality of video game media according to the proprietary instructions and stream the game data to the game console over the connection while buffering in the console specific instantiated secured buffer an amount of the game data, where the amount is restricted from exceeding no more than ten percent of a capacity of at least one of the plurality of video game media; and
   wherein the memory comprises no more than one gigabyte of storage space.

2. The changer of claim 1, wherein the software instructions are further configured to authenticate the changer as a viable source of any game data.

3. The changer of claim 1, wherein the software instructions are further configured to provide information associated with the changer for display on an on-screen menu through the game console.

4. The changer of claim 1 further comprising a common housing in which is disposed the module, the media interface, the communication interface, and the magazine.

5. The changer of claim 4, wherein the media interface is removable from the common housing.

6. The changer of claim 4, wherein the magazine is removable from the common housing.

7. The changer of claim 4, wherein the common housing comprises removable faceplates.

8. The changer of claim 1, wherein the module is configured to restrict the amount to no more than one percent of the capacity of the at least one of the plurality of video game media.

9. The changer of claim 8, wherein the module is configured to restrict the amount to no more than 0.02 percent of the capacity of the at least one of the plurality of video game media.

10. The changer of claim 1, wherein the memory stores an identifier indicating that the changer is produced under license of a producer of the game console.

11. The changer of claim 1, wherein the communication interface comprises a wired interface.

12. The changer of claim 11, wherein the wired interface is selected from the group consisting of: an Ethernet interface, a USB interface, and a Firewire interface.

13. The changer of claim 1, wherein the communication interface comprises a wireless interface.

14. The changer of claim 13, wherein the wireless interface is selected from the group consisting of: an 802.15 interface, a wireless USB interface, and an 802.11 interface.

15. The changer of claim 1, wherein at least one of the plurality of video game media comprises an optical disc.

16. The changer of claim 1, wherein at least one of the plurality of video game media comprise a cartridge.

17. The changer of claim 1, wherein the magazine is configured to hold a heterogeneous mix of game media.

18. The changer of claim 1 wherein the magazine holds at least 6 game media.

19. The changer of claim 18, wherein the magazine holds at least 12 game media.

20. The changer of claim 1, wherein the magazine comprises a carousel.

21. The changer of claim 1, wherein the software instructions are further configured to erase buffered game data upon removal of the magazine.

\* \* \* \* \*